(12) United States Patent
Chen et al.

(10) Patent No.: US 10,890,486 B2
(45) Date of Patent: Jan. 12, 2021

(54) PLASMONIC NANOSTRUCTURE INCLUDING SACRIFICIAL PASSIVATION COATING

(71) Applicant: Hewlett-Packard Development Company, L.P., Houston, TX (US)

(72) Inventors: Zhizhang Chen, Corvallis, OR (US); Chien-Hua Chen, Corvallis, OR (US); James Elmer Abbott, Jr., Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 40 days.

(21) Appl. No.: 16/062,356

(22) PCT Filed: Apr. 19, 2016

(86) PCT No.: PCT/US2016/028272
§ 371 (c)(1),
(2) Date: Jun. 14, 2018

(87) PCT Pub. No.: WO2017/184120
PCT Pub. Date: Oct. 26, 2017

(65) Prior Publication Data
US 2018/0372543 A1 Dec. 27, 2018

(51) Int. Cl.
*G01J 3/44* (2006.01)
*B01L 3/00* (2006.01)
(Continued)

(52) U.S. Cl.
CPC .......... *G01J 3/44* (2013.01); *B01L 3/502707* (2013.01); *B01L 3/502715* (2013.01);
(Continued)

(58) Field of Classification Search
CPC .......... B01L 2300/12; B01L 3/502707; B01L 3/502715; B82Y 15/00; B82Y 20/00; G01J 3/44; G01N 2021/651; G01N 21/658
(Continued)

(56) References Cited

U.S. PATENT DOCUMENTS

| 9,377,409 B2 * | 6/2016 | Hu ........................ G01N 21/658 |
| 2003/0055171 A1 * | 3/2003 | Overbeek .......... C08G 18/0823 525/192 |

(Continued)

FOREIGN PATENT DOCUMENTS

| CN | 103785492 | 5/2014 |
| CN | 104011520 | 8/2014 |

(Continued)

OTHER PUBLICATIONS

Zhang, X. Et al., "Ultrastable Substrates for Surface-Enhanced Raman Spectroscopy: Al2O3 Overlayers Fabricated by Atomic Layer Deposition Yield Improved Anthrax Biomarker Detection", Jul. 19, 2006, 46 pages.

(Continued)

Primary Examiner — Sunghee Y Gray
(74) Attorney, Agent, or Firm — Tong Rea Bentley & Kim LLC

(57) ABSTRACT

In an example, a lab-on-chip Raman spectroscopy system is described. The lab-on-chip system includes a housing having a fluid channel formed thereon. The fluid channel is coupled to an inlet and to an outlet. A surface-enhanced Raman spectroscopy substrate is positioned inside the fluid channel. The surface-enhanced Raman spectroscopy substrate includes a plasmonic nanostructure and a sacrificial, conformal passivation coating deposited over at least the plasmonic nanostructure.

17 Claims, 3 Drawing Sheets

(51) Int. Cl.
*G01N 21/65* (2006.01)
*B82Y 15/00* (2011.01)
*B82Y 20/00* (2011.01)

(52) U.S. Cl.
CPC ........ *G01N 21/658* (2013.01); *B01L 2300/12* (2013.01); *B82Y 15/00* (2013.01); *B82Y 20/00* (2013.01); *G01N 2021/651* (2013.01)

(58) Field of Classification Search
USPC ........................................................ 356/301
See application file for complete search history.

(56) References Cited

U.S. PATENT DOCUMENTS

| | | | |
|---|---|---|---|
| 2010/0110551 A1* | 5/2010 | Lamansky | G02B 5/021 |
| | | | 359/599 |
| 2010/0129623 A1 | 5/2010 | Johansson et al. | |
| 2011/0019195 A1 | 1/2011 | Yamamichi et al. | |
| 2011/0109902 A1* | 5/2011 | Lin | G01N 21/658 |
| | | | 356/301 |
| 2011/0241042 A1* | 10/2011 | Chen | H01L 33/08 |
| | | | 257/94 |
| 2012/0081703 A1* | 4/2012 | Moskovits | G01N 21/658 |
| | | | 356/301 |
| 2012/0092661 A1 | 4/2012 | Ebstein | |
| 2012/0194813 A1 | 8/2012 | Tzeng | |
| 2014/0029002 A1 | 1/2014 | Wang et al. | |
| 2014/0069496 A1* | 3/2014 | Biswas | B82Y 20/00 |
| | | | 136/256 |
| 2015/0083461 A1* | 3/2015 | Burberry | H01B 1/08 |
| | | | 174/126.2 |
| 2015/0153283 A1 | 6/2015 | Huang et al. | |
| 2015/0355097 A1 | 12/2015 | Zhou et al. | |
| 2015/0377893 A1* | 12/2015 | Osterfeld | G01N 33/587 |
| | | | 506/9 |

FOREIGN PATENT DOCUMENTS

| | | |
|---|---|---|
| CN | 104937391 | 9/2015 |
| WO | WO-2009068041 A1 | 6/2009 |
| WO | WO-2011155909 A2 | 12/2011 |
| WO | WO-2012051451 A2 | 4/2012 |
| WO | WO-2014089120 A1 | 6/2014 |

OTHER PUBLICATIONS

Im, Hyungsoon et al. "Atomic Layer Deposition of Dielectric Overlayers for Enhancing the Optical Properties and Chemical Stability of Plasmonic Nanoholes", ACS nano, Feb. 23, 2010 p. 947, XP055091204 USA, URL: http://www.ncbi.nlm.nih.gov/pubmed/20131870.

* cited by examiner

US 10,890,486 B2

PLASMONIC NANOSTRUCTURE INCLUDING SACRIFICIAL PASSIVATION COATING

BACKGROUND

Raman spectroscopy is a spectroscopic technique that can be used to identify molecules in a sample. The technique relies on Raman (inelastic) scattering of emitted monochromatic light. The emitted light interacts with molecular vibrations, phonons, or other excitations in the sample, which causes the energy of the emitted photons to be shifted up or shifted down. Information about the vibrational modes in the sample can be inferred from the shift in energy. This information can, in turn, be used to identify the molecules in the sample, since vibrational information is specific to the chemical bonds and symmetry of molecules.

Although spontaneous Raman spectroscopy is a powerful molecular detection technique, Raman-scattered signals tend to be very weak. These signals can be enhanced by many orders of magnitude by using specially patterned structures that locally enhance the electric field of the light source and the emitted light. This technique is known as surface-enhanced Raman spectroscopy (SERS). In SERS, sample molecules are adsorbed onto rough metal surfaces and/or by nanostructures. For instance, a liquid sample may be deposited onto a silicon or glass surface having a nanostructured noble metal surface.

DETAILED DESCRIPTION

The present disclosure broadly describes a surface-enhanced Raman spectroscopy (SERS) substrate having a sacrificial conformal passivation layer and a method of depositing the sacrificial conformal passivation layer on the SERS substrate. Plasmonic materials, such as those that may be used to fabricate SERS substrates, are susceptible to contamination from ambient conditions, particularly when deployed in lab-on-chip packages which include other materials whose outgassing products can negatively react with the plasmonic materials. Contamination of the SERS substrate can, in turn, lead to decreased signal-to-noise ratio and a general degradation in performance.

Examples of the present disclosure provide a SERS substrate having a sacrificial conformal passivation coating that protects the plasmonic materials of the SERS substrate from external contamination prior to use. The sacrificial conformal passivation coating is removable, for example using a reagent, so that it does not interfere with the operation of the SERS substrate when the SERS substrate is ready for use.

Figure 1:
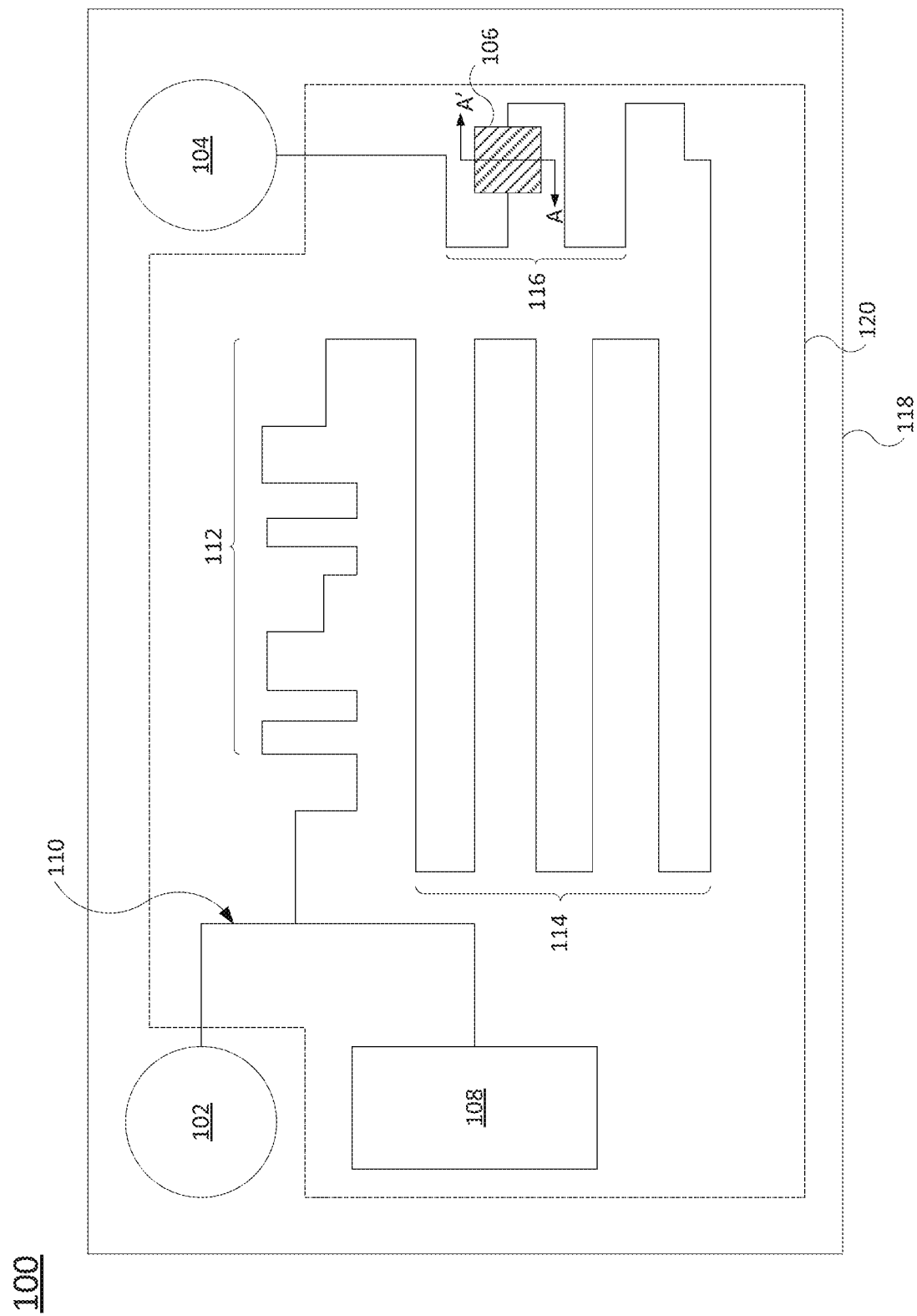
FIG. 1 is a high-level block diagram of an example lab-on-chip Raman spectroscopy system including a surface-enhanced Raman spectroscopy (SERS) substrate of the present disclosure.

FIG. 1 is a high-level block diagram of an example lab-on-chip Raman spectroscopy system 100 including a surface-enhanced Raman spectroscopy (SERS) substrate 106 of the present disclosure. In one example, the system 100 includes an inlet 102, an outlet 104, the SERS substrate 106, a reservoir 108, and a fluid channel 110. In one example, all of these components are arranged on a housing 118 that is sealed by a lid 120.

In one example, the housing 118 comprises a substantially flat substrate formed, for example, from injection-molded plastic such as cyclic olefin polymer, poly(methyl methacrylate), polystyrene, polycarbonate, polydimethylsiloxane, or silicone. The fluid channel 110 is positioned on the housing 118 and may occupy a large portion (e.g., half or more) of the housing's surface area. The inlet 102 and the outlet 104 are also positioned on the housing 118, at opposite ends of the fluid channel 110. The housing 118, fluid channel 110, inlet 102, and outlet 105 may be injection molded as a single integrated unit.

The fluid channel 110 is positioned to transport a fluid, such as a liquid analyte solution containing a sample whose molecular composition is to be identified, from the inlet 102 to the outlet 104. The fluid channel 110 may comprise a substantially serpentine path and may include two or more functionally and physically distinct regions between the inlet 102 and the outlet 104. For instance, the fluid channel 110 may include a polymerase chain reaction (PCR) amplification region 112, a separator region 114, and/or a detector region 116. In this case, the PCR amplification region 112 is positioned closest to the inlet 102, the detector region 116 is positioned closest to the outlet 104, and the separator region 114 is positioned between the PCR amplification region 112 and the detector region 116.

The SERS substrate 106 is positioned inside the fluid channel 110, in the detector region 116, so that a flow of an analyte solution through the fluid channel 110 will encounter and interact with the SERS substrate 106. The SERS substrate 106 comprises a patterned surface structure designed to enhance Raman scattered signals emitted by an analyte solution flowing through the fluid channel 110 and activated with excitation light (not shown).

Figure 2:
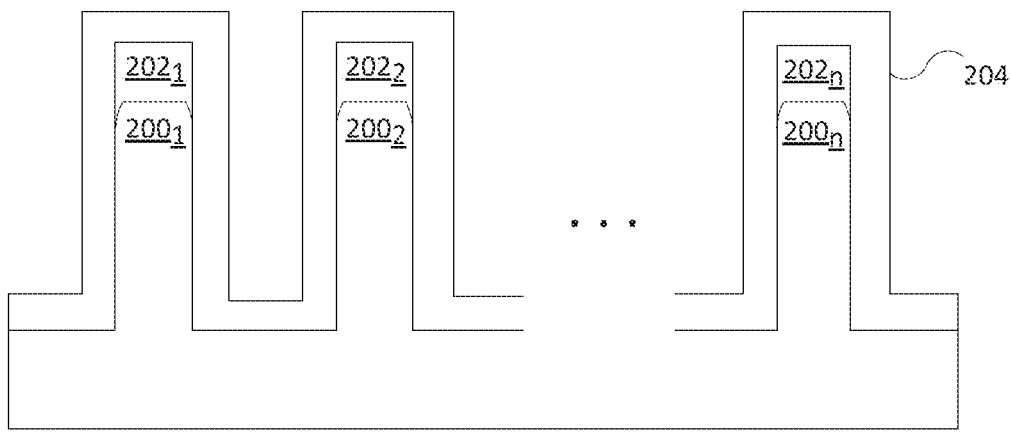
FIG. 2 is a cross sectional diagram taken along line A-A' of FIG. 1 and illustrating a portion of a cross section of an example surface-enhanced Raman spectroscopy substrate.

FIG. 2, for example, is a cross sectional diagram taken along line A-A' of FIG. 1 and illustrating a portion of a cross section of an example SERS substrate 106. FIG. 2 is not to scale. As illustrated, the SERS substrate 106 may comprise a two-dimensional array of fingers $200_1$-$200_n$ (hereinafter collectively referred to as "fingers 200"). The fingers 200 may be formed from a polymer and may each include a corresponding cap $202_1$-$202_n$ (hereinafter collectively referred to as "caps 202"). The caps 202 may be formed from a plasmonic material, such as gold, silver, and/or copper coating or nanoparticles. The fingers 200, including the caps 202, are coated with a sacrificial conformal passivation coating 204. The passivation coating 204 may be formed, for example, from zinc oxide, titanium dioxide, aluminum oxide, tantalum oxide, silicon dioxide, silicon nitride, silicon carbide, zirconium oxide, hafnium oxide, and/or chromium oxide. One or more of these materials may also be used in combination with other materials. For instance, different zinc oxide-based materials, including indium gallium zinc oxide, zinc tin oxide, and aluminum-doped zinc oxide may also be used in the passivation coating 204. Using a combination of cations may help to achieve amorphous properties that can lead to better barrier properties, while the zinc oxide can help to facilitate removal of the sacrificial material. Similar types of combinations based on other oxides, including the oxides listed above, can also be used to maximize barrier properties while facilitating efficient removal. In further examples, the passivation coating 204 may also comprise multiple layers, where each layer is formed from a different one of these materials.

Referring back to FIG. 1, the fluid channel 110 is also fluidly coupled to the reservoir 108, which may contain a supply of a liquid reagent. The liquid reagent may comprise a substance that is capable of stripping the passivation coating 204 from the SERS substrate 106, such as diluted hydrochloric acid.

The lid 120 is positioned over the lab-on-chip system 100 to seal the components from external conditions. The lid 120 may be formed, for example, from a polymer, glass, silicon, a metal sheet, or other materials.

The lab-on-chip system 100 may be fabricated as illustrated, including the passivation coating 204 formed over the SERS substrate 106. The passivation coating 204 protects the SERS substrate 106, and in particular protects the plasmonic materials of the SERS substrate 106 (e.g., the caps 202 on the fingers 200) from contamination. For instance, without the passivation coating 204, the caps 202 might be contaminated by outgassing products produced by the polymer fingers 200 and/or by ambient conditions during storage and/or shipping of the lab-on-chip system 100. When the lab-on-chip system 100 is ready to be used for sample analysis, the passivation coating 204 may be stripped from the SERS substrate 106. Thus, while the passivation coating 204 protects the integrity of the SERS substrate 106 prior to use of the lab-on-chip system 100, it does not impair the enhancement abilities of the SERS substrate 106 when the lab-on-chip system 100 is ready to be used.

In one example, an atomic layer deposition (ALD) process may be used to deposit the sacrificial conformal passivation coating 204 on the SERS substrate 106. ALD is capable of depositing an easily removable, uniform, conformal thin film even in a tight or tortuous space such as the fluid channel 110. Moreover, ALD can be performed at a relatively low temperature (e.g., two hundred degrees Celsius), and ALD films have demonstrated thermal stability, mechanical flexibility, low defect density, freedom from pin holes, and excellent dielectric strength.

Figure 3:
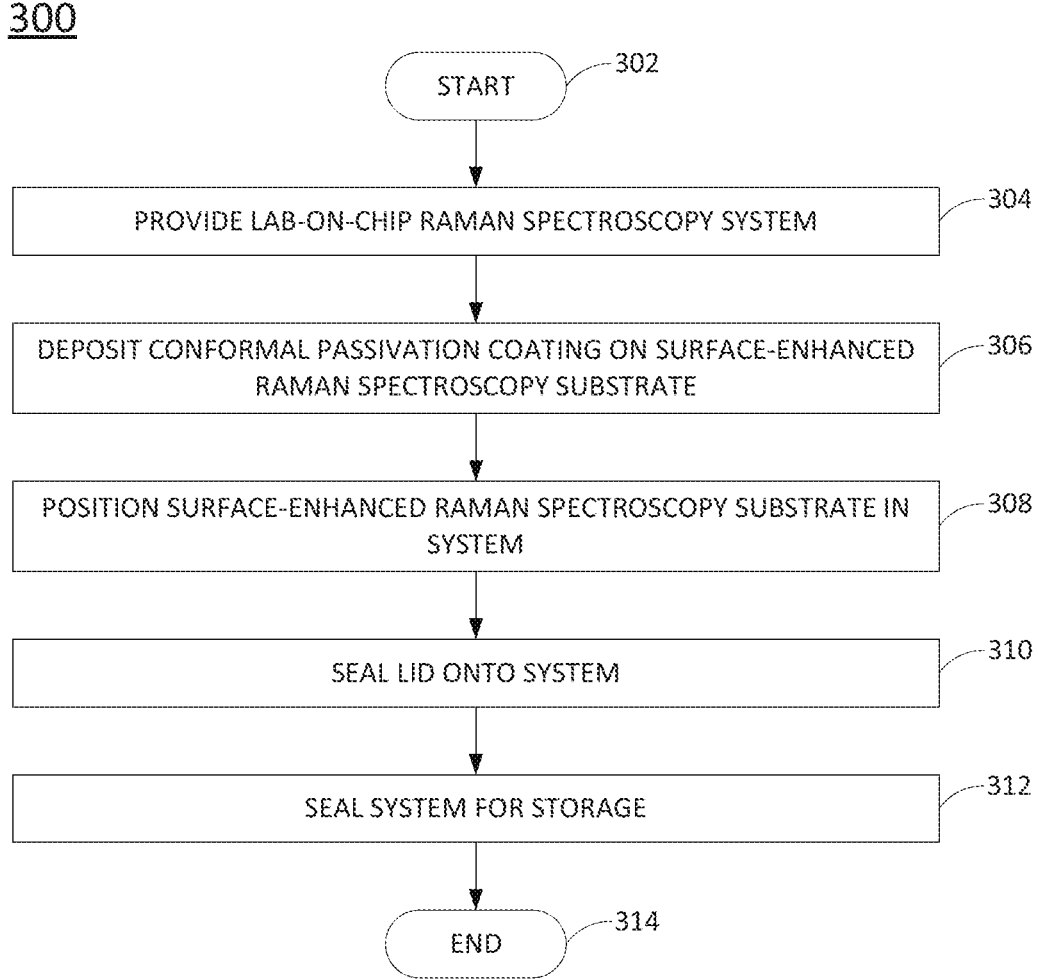
FIG. 3 illustrates a flowchart of an example method for fabricating a lab-on-chip Raman spectroscopy system, such as the system illustrated in FIG. 1.

FIG. 3 illustrates a flowchart of an example method 300 for fabricating a lab-on-chip Raman spectroscopy system, such as the system 100 illustrated in FIG. 1. The fabricated system includes a SERS substrate having a conformal passivation coating as described above.

The method 300 begins in block 302. In block 304, a lab-on-chip Raman spectroscopy system, such as the system 100 illustrated in FIG. 1, is provided. In one example, the system includes a housing on which at least a fluid channel, a sample inlet, and a sample outlet have been fabricated. For instance, one or more of the housing, the fluid channel, the sample inlet, and the sample outlet are injection molded as a single integrated unit. The system may additionally include at least one reservoir, as well as at least one pump (e.g., connected to the sample inlet and/or reservoir).

In block 306, a sacrificial conformal passivation coating is deposited on a SERS substrate. The SERS substrate may include a plasmonic patterned surface structure, such as a two-dimensional array of polymer fingers capped with metallic nanoparticles. In one example, the sacrificial conformal passivation coating is deposited using an ALD process. The passivation coating may be formed, for example, from zinc oxide, titanium dioxide, aluminum oxide, tantalum oxide, silicon dioxide, silicon nitride, silicon carbide, zirconium oxide, hafnium oxide, and/or chromium oxide. One or more of these materials may also be used in combination with other materials. For instance, different zinc oxide-based materials, including indium gallium zinc oxide, zinc tin oxide, and aluminum-doped zinc oxide may also be used in the passivation coating 204. Using a combination of cations may help to achieve amorphous properties that can lead to better barrier properties, while the zinc oxide can help to facilitate removal of the sacrificial material. Similar types of combinations based on other oxides, including the oxides listed above, can also be used to maximize barrier properties while facilitating efficient removal. In further examples, the passivation coating may comprise multiple layers, where each layer is formed from a different one of these materials.

In block 308, the SERS substrate is positioned in the lab-on-chip Raman spectroscopy system. In one example, the SERS substrate is positioned inside the fluid channel, near the outlet.

In block 310, a lid is sealed onto the lab-on-chip Raman spectroscopy system system, for example using an adhesive, an epoxy, or other sealing means. However, the inlet and outlet are still accessible, for example as illustrated in FIG. 1. That is, the lid may not cover the inlet and the outlet.

In block 312, the lab-on-chip Raman spectroscopy system is sealed for storage. In one example, sealing the system for storage includes sealing the entire system with a removable seal such as a tape, an aluminum-coated plastic sheet, or the like.

The method 300 ends in block 314.

As discussed above, the sacrificial conformal passivation coating can be easily removed from the SERS substrate when the lab-on-chip Raman spectroscopy system is ready to be used for sample analysis. Removal of the sacrificial conformal passivation coating may be implemented as part of the sample preparation process.

Figure 4:
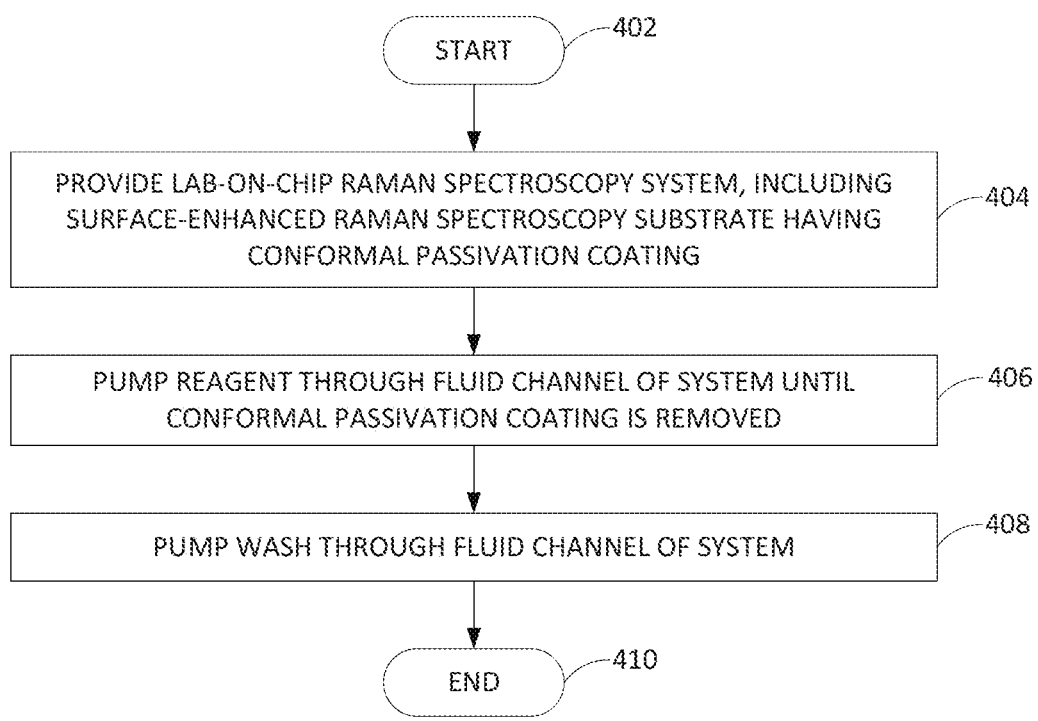
FIG. 4 illustrates a flowchart of an example method for removing a conformal passivation coating from a surface-enhanced Raman spectroscopy substrate positioned in a lab-on-chip Raman spectroscopy system, such as the system illustrated in FIG. 1.

FIG. 4 illustrates a flowchart of an example method 400 for removing a sacrificial conformal passivation coating from a SERS substrate positioned in a lab-on-chip Raman spectroscopy system, such as the system 100 illustrated in FIG. 1. The fabricated system includes a SERS substrate having a sacrificial conformal passivation coating as described above.

The method 400 begins in block 402. In block 404, a lab-on-chip Raman spectroscopy system, such as the system 100 illustrated in FIG. 1, is provided. In one example, the system includes a housing on which at least a fluid channel, a sample inlet, and a sample outlet have been fabricated. For instance, one or more of the housing, the fluid channel, the sample inlet, and the sample outlet may be injection molded as a single integrated unit. The system may additionally include at least one reservoir, as well as at least one pump (e.g., connected to the sample inlet and/or the reservoir). In addition, the system includes a SERS substrate that has been coated with a sacrificial conformal passivation coating, such as the SERS substrate 106 illustrated in FIG. 2.

In block 406, a reagent is pumped through the fluid channel until the passivation coating is removed. The reagent may be supplied from the reservoir or from another on-chip or external location. In one example, the reagent is diluted hydrochloric acid (e.g., one hundred parts water to one part hydrochloric acid).

In block 408, a wash is pumped through the fluid channel to rinse the reagent and any remaining traces of the conformal passivation coating from the system. The wash may be supplied from the reservoir or from another on-chip or external location.

The method 400 ends in block 410.

Once the method 400 has been completed, the lab-on-chip Raman spectroscopy system is ready for use. A liquid analyte solution containing the sample to be analyzed may then be introduced at the inlet and pumped through the fluid channel to the outlet.

Variants of the above-disclosed and other features and functions, or alternatives thereof, may be combined into many other different systems or applications. Various presently unforeseen or unanticipated alternatives, modifications, or variations therein may be subsequently made which are also intended to be encompassed by the following claims.

What is claimed is:

1. An apparatus, comprising:
   a housing;
   a fluid channel formed on the housing, wherein the fluid channel is coupled to an inlet and to an outlet; and
   a substrate positioned inside the fluid channel, wherein the substrate comprises:
      a plasmonic nanostructure; and
      a conformal passivation coating deposited at least over the plasmonic nanostructure and formed from a material that protects the plasmonic nanostructure from contamination by ambient conditions and by outgassing products from other components of the substrate, wherein the material is removable from the plasmonic nanostructure using a liquid reagent, wherein the material comprises zinc oxide and a combination of cations.

2. The apparatus of claim 1, wherein the apparatus comprises a lab-on-chip Raman spectroscopy system.

3. The apparatus of claim 2, wherein the substrate is a surface-enhanced Raman spectroscopy substrate.

4. The apparatus of claim 1, wherein the plasmonic nanostructure comprises:
   a two-dimensional array of polymer fingers; and
   a metallic cap formed on each finger in the array of polymer fingers.

5. The apparatus of claim 1, further comprising:
   a reservoir fluidly coupled to the fluid channel; and
   the liquid reagent contained within the reservoir.

6. The apparatus of claim 5, wherein the liquid reagent comprises hydrochloric acid.

7. The apparatus of claim 1, wherein the conformal passivation coating comprises indium gallium zinc oxide.

8. The apparatus of claim 1, wherein the conformal passivation coating comprises zinc tin oxide.

9. The apparatus of claim 1, wherein the conformal passivation coating comprises aluminum-doped zinc oxide.

10. The apparatus of claim 1, wherein the conformal passivation coating comprises multiple layers of material, and each layer of the multiple layers of material is formed from a different material.

11. An apparatus, comprising:
    a substrate;
    a plasmonic nanostructure formed on the substrate; and
    a conformal passivation coating deposited over the plasmonic nanostructure and formed from a material that protects the plasmonic nanostructure from contamination by ambient conditions and by outgassing products from other components of the substrate, wherein the material is removable from the plasmonic nanostructure using a liquid reagent, wherein the material comprises zinc oxide and a combination of cations.

12. A method, comprising:
    depositing a conformal passivation coating over a plasmonic nanostructure of a substrate, wherein the conformal passivation coating is formed from a material that protects the plasmonic nanostructure from contamination by ambient conditions and by outgassing products from other components of the substrate, and wherein the material is removable from the plasmonic nanostructure using a liquid reagent, wherein the material comprises zinc oxide and a combination of cations; and
    positioning the substrate inside a fluid channel of a system including the fluid channel, an inlet coupled to the fluid channel, and an outlet coupled to the fluid channel, wherein the positioning is performed subsequent to depositing the sacrificial, conformal passivation coating.

13. The method of claim 12 wherein the system comprises a lab-on-chip Raman spectroscopy system, and wherein the substrate is a surface-enhanced Raman spectroscopy substrate.

14. The method of claim 12, wherein the plasmonic nanostructure comprises:
    a two-dimensional array of polymer fingers; and
    a metallic cap formed on each finger in the array of polymer fingers.

15. The method of claim 12, wherein the depositing is performed using an atomic layer deposition process.

16. The method of claim 12, wherein the system further comprises:
    a reservoir fluidly coupled to the fluid channel; and
    the liquid reagent contained within the reservoir.

17. The method of claim 12, further comprising, subsequent to the positioning:
    sealing the system;
    subsequent to the sealing, pumping the liquid reagent through the fluid channel until the conformal passivation coating is removed; and
    pumping a wash through the fluid channel to rinse the liquid reagent and the conformal passivation coating from the system.

* * * * *